(No Model.)
G. DE LAVAL.
CENTRIFUGAL CREAMER.
No. 293,314. Patented Feb. 12, 1884.
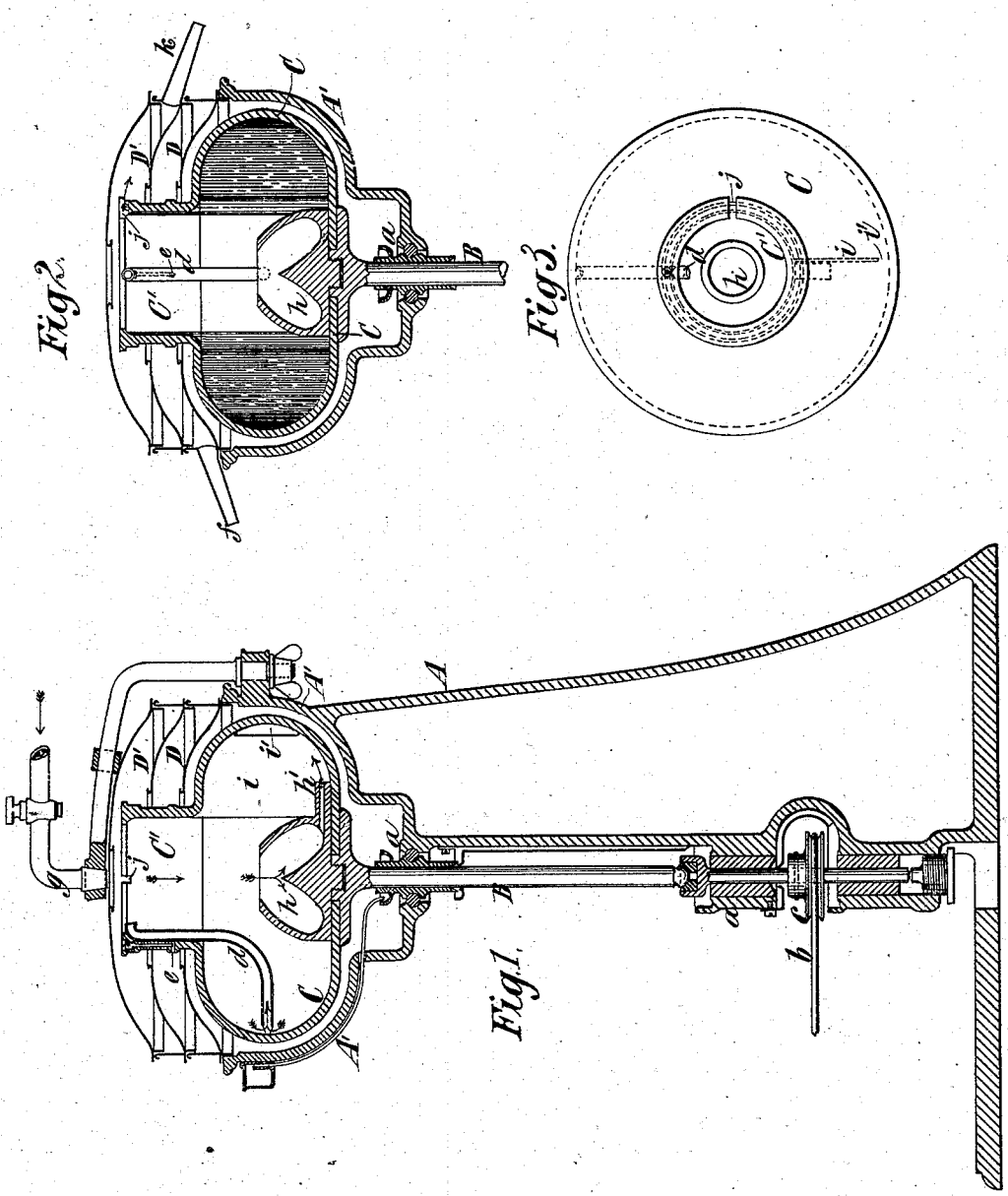
Witnesses
Geo. H. Haynes
Ed. L. Moran
Inventor
Gustaf de Laval
by his Att'y Homeyer
Brown & Brown

UNITED STATES PATENT OFFICE.

GUSTAF DE LAVAL, OF STOCKHOLM, SWEDEN.

CENTRIFUGAL CREAMER.

SPECIFICATION forming part of Letters Patent No. 293,314, dated February 12, 1884.

Application filed August 24, 1883. (No model.)

*To all whom it may concern:*

Be it known that I, GUSTAF DE LAVAL, of Stockholm, in the Kingdom of Sweden, have invented a new and useful Improvement in Centrifugal Creamers, of which the following is a specification.

My invention is applicable generally to the separation of compound fluids; but is more particularly intended for creaming milk by the well-known centrifugal process.

The objects of my invention are to prevent the clogging by impurities of the orifice through which the cream is delivered from the rotating vessel, to enable the vessel to be more readily cleaned, and to dispense, as far as possible, with all parts which are usually detachably connected with said vessel.

The invention consists in a rotary vessel for a fluid-separator, provided with an upwardly-projecting throat, open at the top, and having a discharge orifice or notch in the upper edge of the throat, through which the lighter fluid or cream is delivered. When the discharge-orifice is made in the form of a notch in the edge of the vessel, any impurities approaching the orifice, instead of clogging the orifice, as in separators heretofore constructed, will be thrown over the upper edge of the throat, and the orifice will thus remain unobstructed.

The invention also consists in the combination, with a rotary vessel for a fluid-separator having an upwardly-projecting throat, of a blade or partition fixed in the vessel beyond the throat for insuring the movement of the fluid with the vessel, and extending nearly but not quite to the wall of the vessel, thereby leaving an opening which facilitates the cleaning of the vessel.

In the accompanying drawings, Figure 1 is a vertical section of an apparatus embodying my invention. Fig. 2 is a similar section of the upper part thereof in a plane at right angles to the plane of Fig. 1, and Fig. 3 is a plan of the rotary vessel.

Similar letters of reference designate corresponding parts in all the figures.

A is the standard or upright frame of the machine, and A' is the outer stationary casing, here shown as formed integral with said standard or frame.

B is the vertical shaft, on the upper end of which is mounted the rotating vessel C. This shaft is held in bearings $a$, and may be rotated by a belt, $b$, on a pulley, $c$.

The casing A' is surmounted by two vessels, D D', the first and lowest of which, D, receives the blue milk from a pipe, $d$, through an orifice, $e$, and from which the milk is delivered through a spout, $f$. (Shown in Fig. 2.)

The vessel C has an upwardly-projecting throat, C', open at the top, and into which the new milk is delivered through a pipe, $g$. The milk falls into a cavity or gutter, $h$, in the bottom of the vessel, from which it passes by a pipe or tube, $h'$. (Shown in Fig. 1.) In the vessel C, and beyond the throat C', is fixed a blade, $i$, which extends nearly but not quite to the side wall of the vessel, leaving an opening, $i'$, between the edge of the blade and the vessel. This opening enables the vessel to be much more readily cleaned than it could if the blade were continued entirely to the side wall of the vessel. In the upper edge of the throat C' is formed a delivery notch or orifice, $j$, for cream, which passes thence into the vessel or receiver D', from whence it is delivered by a spout, $k$. It is advantageous to have the delivery-orifice for cream thus formed, because if any impurities approach it they will rise and be thrown over the upper edge of the throat C'; hence the orifice will not be liable to be clogged, as is the case where the orifice is formed by a fine hole or boring in the usual way.

I am aware that it is not new to construct a rotary vessel for a fluid-separator with an upwardly-projecting throat, open at the top, and having in its side and below its upper edge a hole for the delivery of a fluid. In this vessel there is no discharge-orifice consisting of a notch in the upper edge of the throat; and I do not claim such a vessel as included in my invention.

What I claim as my invention, and desire to secure by Letters Patent, is—

1. A rotary vessel, C, for a fluid-separator, provided with an upwardly-projecting throat, C', open at the top, and having a discharge orifice or notch, $j$, in its upper edge, substantially as and for the purpose described.

2. The combination, with the rotary vessel C, of the blade $i$, extending nearly but not quite to the side wall of the vessel, leaving an opening, $i'$, between the outer edge of the blade and the vessel, substantially as described, and as illustrated in the accompanying sheet of drawings.

GUSTAF DE LAVAL.

Witnesses:
F. ENGEL,
F. CLAIRMONT.